United States Patent
Carpenter

(10) Patent No.: US 6,464,170 B2
(45) Date of Patent: Oct. 15, 2002

(54) AIRCRAFT AND AIRCRAFT MANUFACTURING METHOD

(75) Inventor: Billy R. Carpenter, Springtown, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/801,308

(22) Filed: Mar. 7, 2001

(65) Prior Publication Data

US 2002/0125371 A1 Sep. 12, 2002

(51) Int. Cl.[7] ................................................. B64C 1/00
(52) U.S. Cl. ........................ 244/120; 244/118.2; 244/36
(58) Field of Search ............................... 244/36, 13, 15, 244/117 R, 119, 120, 124, 118.2

(56) References Cited

U.S. PATENT DOCUMENTS 2,352,323 A * 6/1944 Hooker ..................... 244/118.2
2,448,862 A * 9/1948 Conklin ..................... 244/118.2
2,638,291 A * 5/1953 Northrop et al. ......... 244/118.2
5,476,704 A * 12/1995 Kohler ........................ 244/120
5,568,903 A * 10/1996 Pena et al. ................... 244/140

* cited by examiner

Primary Examiner—Galen L. Barefoot
(74) Attorney, Agent, or Firm—Bracewell & Patterson, L.L.P.

(57) ABSTRACT

An aircraft and method of manufacture therefor are provided. A fuselage is formed of composite materials and in at least two sections, each section having an integral, internal longeron spanning a length of the sections. The sections are connected by slidingly engaging a male dovetail connector on a longeron of one section with a female dovetail connector on a longeron of another section. Outer edges of the sections of the fuselage have tongue-and-groove connectors that engage to fasten the edges of one section to the edges of another section as the sections are slidingly connected. Fasteners are inserted through the longerons, and other fasteners are inserted through the connectors of the outer edges.

20 Claims, 2 Drawing Sheets

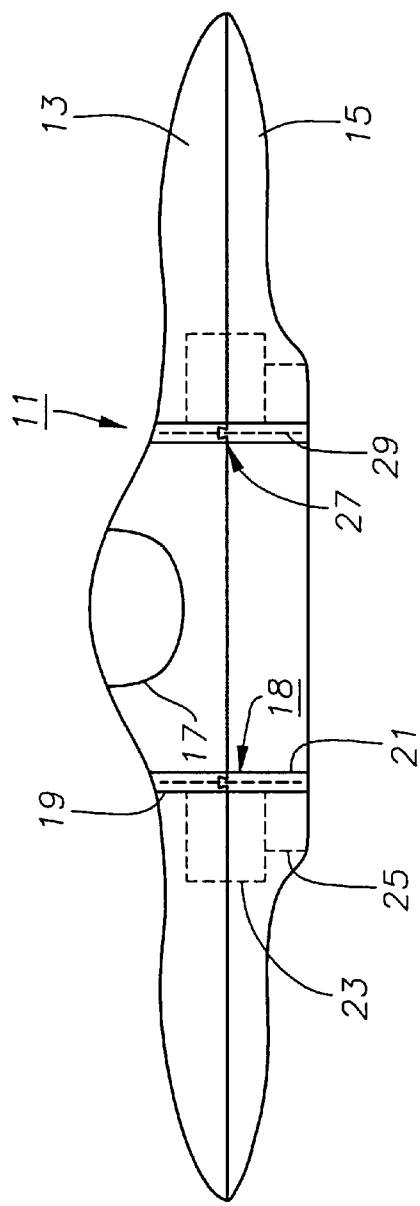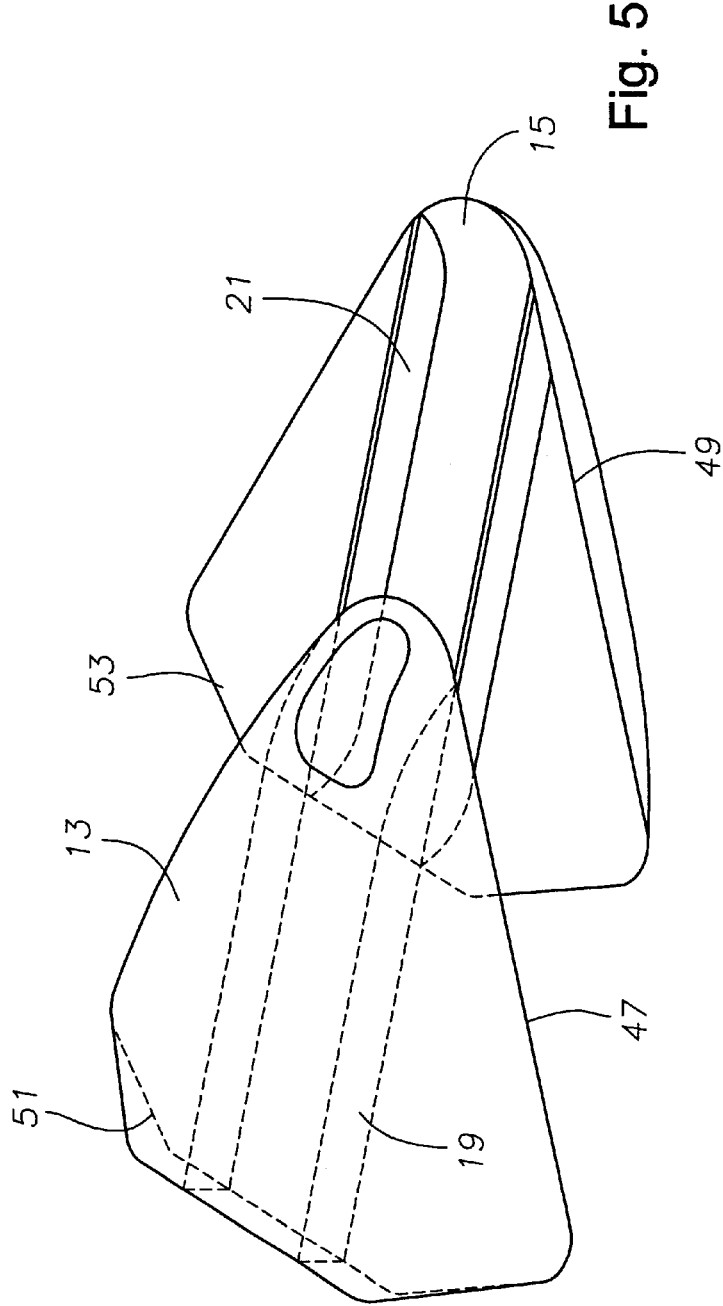

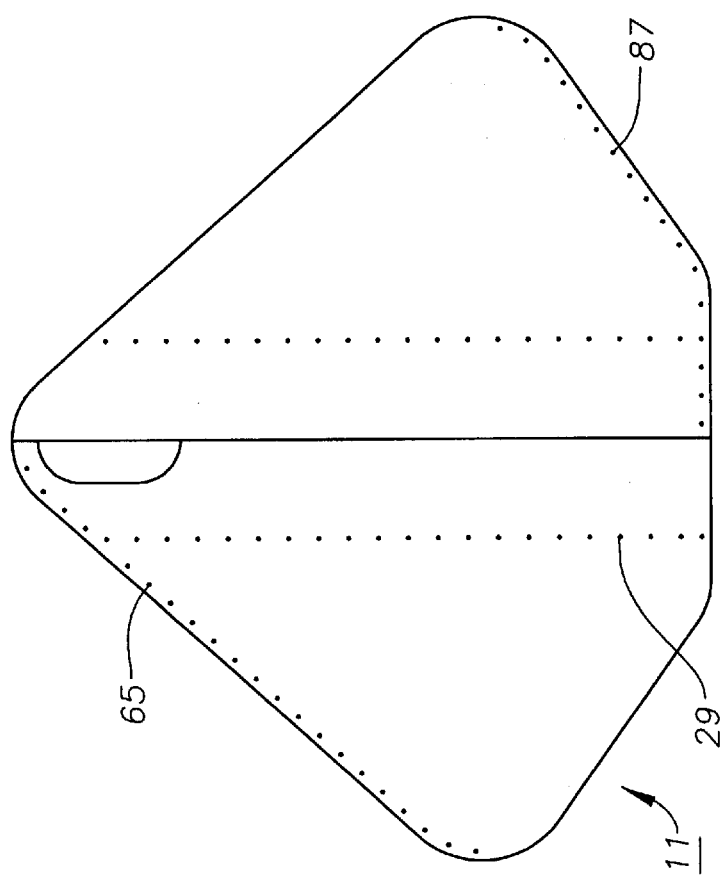
Fig. 6
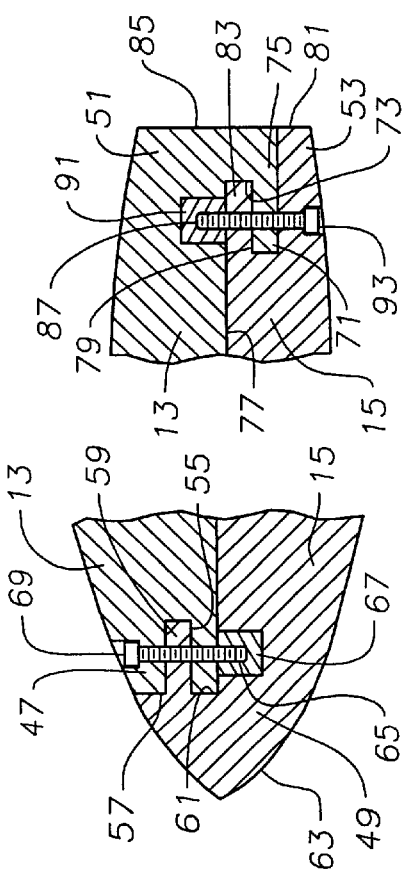
Fig. 4
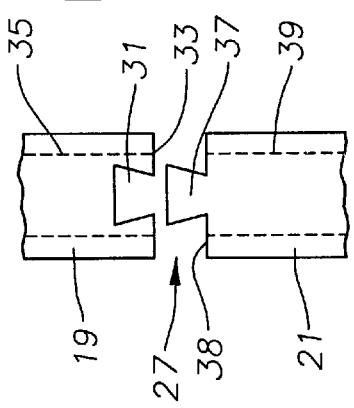
Fig. 2
Fig. 3

AIRCRAFT AND AIRCRAFT MANUFACTURING METHOD

BACKGROUND OF THE INVENTION

1. Field of the Invention

This invention generally relates to aircraft and aircraft manufacturing and particularly relates to aircraft having a fuselage with integral, internal structural members and the method of manufacturing therefor.

2. Description of the Prior Art

Aircraft fuselages are typically assembled by constructing a metal frame structure from beams and attaching panels to the outside of the frame. The frame gives rigidity and strength to the aircraft, and the panels form an enclosure to provide a streamlined outer surface to reduce aerodynamic drag and to protect the components carried within the frame from the exterior environment. The panels may be riveted or adhered to the frame.

A second method of constructing a fuselage is to machine the fuselage, or a portion thereof, from a solid block of metal. The fuselage comprises strengthening members that obviate the need for a separate frame. Holes in the fuselage are provided to lighten the fuselage and to allow access to internal components of the aircraft after assembly. These holes are covered by panels affixed to the fuselage.

Composite materials are used to construct sections of aircraft, but the use has generally been limited to wing surfaces and exterior panels. A method of construction which would provide integral frame members and limit the number of joints in a composite fuselage would allow for cost-effective manufacturing of strong, light aircraft.

SUMMARY OF THE INVENTION

An aircraft and method of manufacturing therefor are provided. A fuselage is formed of composite materials and in at least two sections, each section having an integral, internal longeron spanning a length of the sections. The sections are connected by slidingly engaging a male dovetail connector on a longeron of one section with a female dovetail connector on a longeron of another section. Outer edges of the sections of the fuselage have tongue-and-groove connectors that engage to fasten the edges of one section to the edges of another section as the sections are slidingly connected. Fasteners are inserted through the longerons, and other fasteners are inserted through the connectors of the outer edges.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a front elevation view of an aircraft constructed in accordance with the present invention;

FIG. 2 is a front view of the longerons of FIG. 1;

FIG. 3 is a perspective view of the aircraft of FIG. 1 shown partially assembled;

FIG. 4 is a cross-section view of the leading edge of the aircraft of FIG. 1;

FIG. 5 is a cross-section view of the trailing edge of the aircraft of FIG. 1; and FIG. 6 is a split plan view showing the top and bottom of the aircraft of FIG. 1.

DETAILED DESCRIPTION OF THE INVENTION

Referring to FIG. 1, aircraft 11 is shown having an upper section 13 and a lower section 15. Aircraft 11 is shown as a flying-wing type having integral wings and a delta configuration. Sections 13, 15 are preferably formed from composite materials such as those known in the art. A cockpit opening 17 is located near the forward end of aircraft 11, allowing for a human pilot or electronic controls to be placed within aircraft 11. Two longerons 18, or main longitudinal beams, each comprising an upper longeron 19 and a lower longeron 21, are located on either side of the longitudinal centerline of aircraft 11. Longerons 18 span the longitudinal length of aircraft 11 at the locations of longerons 18. Upper longeron 19 is preferably molded as an integral portion of upper section 13 of aircraft 11, and lower longeron 21 is formed as part of lower section 15. Longerons 18 provide the main source of strength against flexion of aircraft 11 around a transverse line. Two engines 23 are shown schematically as being located immediately to the outside of longerons 18. Below engines 23 are bays 25 for the main landing gear, bays 25 also being shown schematically. Longerons 19, 21 are fastened to each other using a dovetail connector 27 and longeron fasteners 29 that extend for the height of assembled longerons 18.

Details of dovetail connector 27 on longerons 19, 21 are shown in FIG. 2. Upper longeron 19 has a recess 31 in its lower surface 33 adapted to be female portion 31 of dovetail connector 27. Vertical holes 35 run through the entire height of upper longeron 19 and are sized for receiving longeron fasteners 29. Holes are spaced apart along the longitudinal length of longerons 19. Lower longeron 21 has a male portion 37 or protuberance of dovetail connector 27 that extends from and above upper surface 38 of lower longeron 21. Male portion 37 is sized to fit tightly within female portion 31, the upper surface of male portion 37 being wider than its junction with longeron 21, so as to lock longerons 19, 21 together. Lower longeron 21 also has holes 39 for longeron fasteners 29, holes 39 spanning the entire height of lower longeron 21. Holes 35, 39 in each longeron, as shown in FIG. 2, are wider than dovetail connector 27, creating interruptions (not shown) in dovetail portions 31, 37. Holes 35, 39 in longerons 19, 21 register when upper longeron 19 is installed on lower longeron 21, allowing a single longeron fastener 29 to pass though each pair of aligned holes 35, 39 of both longerons 19, 21 to prevent movement of longerons 19, 21 relative to one another. Referring again to FIG. 1, longeron fasteners 29 preferably comprise a male section and a female section, one section being inserted from above upper longeron 19, and the other section being inserted from below lower longeron 21.

FIG. 3 shows upper section 13 partially assembled with lower section 15. Upper section is positioned above and behind lower section 15, male connector 37 (FIG. 2) of each upper longeron 19 aligning with female connector 31 (FIG. 2) on corresponding lower longeron 21. Upper section 13 is then moved horizontally forward, with male dovetail portion 37 sliding into female portion 31 for the length of longerons 19, 21. At the installed position, leading edge 47 of upper section 13 is aligned with leading edge 49 of lower section 15, and trailing edges 51, 53 are also aligned. Alternatively, longitudinally spaced-apart gaps in dovetail connector 27 may be provided to allow upper section 13 to be moved vertically downward onto lower section 15. Then, upper section 13 would be moved horizontally forward until leading edges 47, 49 and trailing edges 51, 53 align.

Referring to FIG. 4, leading edge 47 of upper section 13 is connected to leading edge 49 of lower section 15 using a tongue-and-groove connection. Groove 55 is formed in forward surface 57 of upper section 13. Tongue 59 extends rearward from a rearward-facing vertical surface 61 extending from and above lower section 15, tongue 59 being sized for insertion into groove 55. Forward end 63 of lower section 15 has a generally-parabolic cross-section forming the terminal forward end of aircraft 11 (FIG. 1). As upper section 13 is moved forward on lower section 15, tongue 59 enters groove 55. Upper section 13 moves forward until forward surface 57 abuts vertical surface 61. The tongue-and-groove connection keep leading edges 47, 49 from moving independently and separating. A fastener 65 is inserted into aligned holes formed or drilled in groove 55 and tongue 59, retaining tongue 59 within groove 55. Fasteners 65 do not extend through height of lower section 15, but are secured by threaded inserts 67 embedded in lower section 15. Space 69 above fastener 65 is filled with a material (not shown) to improve airflow over fastener 65 and to reduce radar cross-section.

FIG. 5 shows the connection for trailing edges 51, 53. A tongue 71 extends forward from a forward-facing surface 73 of an extension 75 depending from lower surface 77 of upper section 13. A groove 79 is formed in rear surface 81 of lower section 15 for receiving tongue 71, the length of upper portion 83 of groove 79 being shorter than the length of the lower portion by a distance equal to the horizontal length of extension 75. As upper section 13 is moved forward, tongue 71 enters groove 79, and upper section 13 continues forward until rear surface 85 of upper section 13 aligns with rear surface 81 of lower section 15. A fastener 87 is inserted into holes formed or drilled in tongue 71 and groove 79. Fasteners 87 are secured by threaded inserts 89 embedded in upper section 13. Space 91 below fastener 87 is filled with a material (not shown), as described above.

The completed assembly of the fuselage of aircraft 11 is shown in FIG. 6. The left half of FIG. 6 is a plan view from above upper section 13, wherein fasteners 65 for leading edges 47, 49 and longeron fasteners 29 are visible. The right half of FIG. 6 is a plan view from below aircraft 11, fasteners 87 for trailing edges 51, 53 and longerons 18 being visible from underneath.

During manufacture, upper section 13 is formed with two integral upper longerons 19 spanning the distance from leading edges 47 of upper section 13 to trailing edges 51. Longeron 19 has a female portion 31 of a dovetail connector formed in its lower surface 33, female portion 31 being a recess adapted to receive a male portion 37. Holes 35 extend vertically through the height of upper longerons 19 for receiving longeron fasteners 29. A cockpit opening 17 is formed near the forward end of upper section 13. A groove is formed in forward surface 57 at leading edge 47 for accepting a corresponding tongue 59 on lower section 15. Trailing edges 51 include a depending extension 75 with a forward-extending tongue 71. Threaded inserts 89 are installed in trailing edges 51 of upper section 13.

Lower section 15 is formed in the same manner as upper section 13, and two lower longerons 21 span the distance between the leading and trailing edges 49, 53. Each longeron has a male portion 37 of a dovetail connector 27 extending from its upper surface 38, the connector 37 being sized to fit in female portion 31 of upper longerons 19. Holes 39 for longeron fasteners 29 extend vertically through the height of lower longerons 21 and are spaced to register with holes 35 in upper section 13. Leading edges 49 of lower section 15 have a rearward-facing vertical surface 61 from which a tongue 59 extends rearward, tongue 59 being adapted to fit in groove 55 of upper section 13. A groove 79 is formed in trailing edges 53 of lower section 15 for accepting tongue 71 of upper section 13. Threaded inserts 67 are installed in leading edges 49 of lower section 15.

During assembly, upper section 13 is positioned above and behind lower section 15. Upper section 13 is then oriented so that female dovetail portions 31 are aligned with corresponding male dovetail portions 37. Upper section 13 is moved forward horizontally, dovetail portions 31, 37 engaging and sliding relative to one another to secure upper longerons 19 to lower longerons 21. Upper section 13 is moved forward until leading edges 47, 49 and trailing edges 51, 53 of sections 13, 15 align and holes 35, 39 in longerons 19, 21 register. Tongues 59, 71 will engage corresponding grooves 55, 79 in leading edges 47, 49 and trailing edges 51, 53. Longeron fasteners 29 are inserted into longerons 19, 21 to prevent upper section 13 from sliding relative to lower section 15. Fasteners 65, 87 are inserted in edges 47, 49, 51, 53 and secured in threaded inserts 67, 89 to prevent separation. Spaces 69,91 exposing areas of fasteners 65, 81 are filled by a material.

The advantages of using the present invention include the ability to reduce the number of joints in the fuselage and wings of an aircraft by forming the entire aircraft in two sections, the sections having integral structural members. The sections can then be assembled by connecting the structural members and outer edges of one section to those of the other section. This provides for a cost-effective means of assembling a light, strong aircraft.

While the invention has been shown in only some of its forms, it is not thus limited but is susceptible to various changes and modifications without departing from the spirit thereof. For example, the dovetail recess and male portions could be reversed, with the recess on the lower longeron. The assembly could be made in reverse, with the upper section sliding rearward on the lower section. Although, in the preferred embodiment, there are only two sections, more than two sections could be employed. Also, though the entire aircraft body is assembled by this method in the preferred embodiment, it is possible for only selected sections of the aircraft to be assembled with this method.

I claim:

1. A method of constructing an aircraft, the method comprising:

forming an upper section having an integral, internal structural member spanning a horizontal dimension of the upper section, the structural member having a height substantially equal to a depth of the upper section and terminating in a lower mating surface;

forming a lower section having an integral, internal structural member spanning a horizontal dimension of the lower section, the structural member having a height substantially equal to a depth of the lower section and terminating in an upper mating surface for engaging the mating surface of the upper section, one of the mating surfaces being a groove and the other being a protuberance;

sliding one of the sections relative to the other, with each groove engaging a protuberance to assemble the sections together;

fixedly attaching the structural members together by using fasteners extending through the structural members.

2. The method of claim 1, wherein the step of forming the sections comprises:
forming the sections from composite materials.

3. The method of claim 1, wherein the step of forming the sections comprises:
forming the structural members as longerons that extend longitudinally along the aircraft.

4. The method of claim 1, wherein the step of forming the sections comprises:
forming the grooves and protuberances in the configuration of a dovetail.

5. The method of claim 1, further comprising:
providing outer edges of the sections with tongue-and-groove connectors that slidingly engage to fasten the edges of one of the sections to the edges of the other of the sections as the sections are slidingly connected.

6. The method of claim 5, further comprising:
inserting fasteners through the tongue-and-groove connectors of the outer edges for fastening the outer edges of one section to the outer edges of the other of the sections.

7. The method of claim 1, wherein:
one section is a lower half of a fuselage and the other section is an upper half of a fuselage.

8. The method of claim 1, wherein:
one section is a lower half of a delta-configured flying wing and the other section is an upper half of a delta-configured flying wing.

9. A method of constructing a body of an aircraft, the method comprising:
forming the body in an upper section and a lower section, each section having an integral, internal structural member spanning a length of the section, each of the structural members having a lengthwise dovetail connector, the structural member of the upper section having a height substantially equal to a depth of the upper section, the structural member of the lower section having a height substantially equal to a depth of the lower section;
providing outer edges of the sections of the body with tongue-and-groove connectors that engage each other;
sliding one section relative to the other, slidingly engaging the dovetail connector on the internal member of the upper section with the dovetail connector on the internal member of the lower section and engaging the tongue-and-groove connectors on the outer edges; then
fixedly attaching the internal members of the sections using fasteners extending through the members; and
inserting fasteners through the connectors of the outer edges for fastening the outer edges of one section to the outer edges of the other of the sections.

10. The method of claim 9, wherein the step of forming the sections comprises: forming the sections from composite materials.

11. The method of claim 9, wherein the step of forming the sections comprises:
forming the structural members as longerons that extend longitudinally along the aircraft.

12. The method of claim 9, wherein:
one section is a lower half of a delta-configured flying wing and the other section is an upper half of a delta-configured flying wing; and
the structural members are formed as longerons that extend longitudinally along the aircraft.

13. A method of constructing a fuselage of an aircraft, the method comprising:
forming the fuselage of composite materials and in upper and lower sections, the upper section having an integral, internal longeron spanning a length of the upper section and having a height substantially equal to a depth of the upper section, the lower section having an integral, internal longeron spanning a length of the lower section and having a height substantially equal to a depth of the lower section;
connecting the sections of the fuselage by slidingly engaging a male dovetail connector on the longeron of one of the sections with a female dovetail connector on the longeron of the other of the sections to assemble the fuselage;
providing outer edges of the sections of the fuselage with tongue-and-groove connectors that engage to fasten the edges of one of the sections to the edges of another of the sections as the sections are slidingly connected;
fixedly attaching the longerons of the sections using fasteners extending through the longerons; and
inserting fasteners through the connectors of the outer edges for fastening the outer edges of one section to the outer edges of the other of the sections.

14. An aircraft, comprising:
upper and lower sections;
an integral, internal structural member in each section, the structural member of the upper section spanning a horizontal dimension of the upper section and having a height substantially equal to a depth of the upper section, the structural member of the lower section spanning a horizontal dimension of the lower section and having a height substantially equal to a depth of the lower section, each structural member having a mating surface for engaging the other structural member, one of the mating surfaces being a groove and the other being a protuberance, the mating surfaces being slidingly engaged with the grooves and protuberances engaging each other to assemble the sections together;
fasteners fixedly attaching the structural members together and extending through the structural members.

15. The aircraft of claim 14, wherein:
the sections are formed from composite materials.

16. The aircraft of claim 14, wherein:
the structural members are longerons that extend longitudinally along the aircraft.

17. The aircraft of claim 14, wherein:
the grooves and protuberances are in the configuration of a dovetail.

18. The aircraft of claim 14, further comprising:
tongue-and-groove connectors on the outer edges of the sections, the connectors slidingly engaging to fasten the edges of one of the sections to the edges of the other of the sections.

19. The aircraft of claim 18, further comprising:
fasteners inserted through the tongue-and-groove connectors of the outer edges for fastening the outer edges of one section to the outer edges of the other of the sections.

20. The aircraft of claim 14, wherein:
one section is a lower half of a fuselage and the other section is an upper half of a fuselage.

* * * * *